United States Patent
Kopp et al.

(10) Patent No.: US 10,353,227 B2
(45) Date of Patent: Jul. 16, 2019

(54) OPTICAL CHIRAL FIBER ISOLATOR AND METHOD OF FABRICATION THEREOF

(71) Applicant: Chiral Photonics, Inc., Pine Brook, NJ (US)

(72) Inventors: Victor Il'ich Kopp, Fair Lawn, NJ (US); Guoyin Zhang, Clifton, NJ (US)

(73) Assignee: Chiral Photonics, Inc., Pine Brook, NJ (US)

( * ) Notice: Subject to any disclaimer, the term of this patent is extended or adjusted under 35 U.S.C. 154(b) by 0 days.

(21) Appl. No.: 15/612,370

(22) Filed: Jun. 2, 2017

(65) Prior Publication Data
US 2017/0336659 A1    Nov. 23, 2017

Related U.S. Application Data

(63) Continuation of application No. 12/492,984, filed on Jun. 26, 2009, now abandoned.

(Continued)

(51) Int. Cl.
*G02F 1/095* (2006.01)
*H01F 7/02* (2006.01)

(52) U.S. Cl.
CPC ......... *G02F 1/0955* (2013.01); *H01F 7/0273* (2013.01)

(58) Field of Classification Search
CPC .... G02B 6/02109; G02B 6/274; G02B 6/276; G02B 6/2726; G02B 6/02085; G02B 6/105

See application file for complete search history.

(56) References Cited

U.S. PATENT DOCUMENTS 5,528,415 A * 6/1996 Gauthier ............... G02F 1/09
                                                        359/282
6,396,859 B1   5/2002 Kopp et al.
(Continued)

FOREIGN PATENT DOCUMENTS

GB        2 176 305 A      12/1986
WO   WO 2002/073247 A2      9/2002
(Continued)

OTHER PUBLICATIONS

T. J. Seok, V. Kopp, D. Neugroschl, J. Henriksson, J. Luo, and M. C. Wu, "High density optical packaging of high radix silicon photonic switches," 2017 Optical Fiber Communications Conference and Exhibition (OFC), Los Angeles, CA, Optical Society of America, pp. 1-3 (2017).

(Continued)

*Primary Examiner* — Sung H Pak
*Assistant Examiner* — Hoang Q Tran
(74) *Attorney, Agent, or Firm* — Knobbe, Martens, Olson & Bear LLP

(57) ABSTRACT

The present invention provides an optical in-fiber chiral fiber isolator, capable of transmitting a signal of a predetermined optical polarization in a forward direction therethrough, while rejecting all signals traveling in a backward direction therethrough, and a method of fabrication thereof. In one exemplary embodiment, the inventive optical chiral fiber isolator includes a chiral magneto-optical fiber having a helical pitch profile, a birefringence profile, and an effective Verdet constant profile, at least a portion of which is exposed to a magnetic field of a predetermined magnetic field profile (generated by a proximal magnetic field source), where the magnetic field profile, the chiral pitch profile, the birefringence profile, and the effective Verdet constant profile are selected and configured such that the inventive isolator is (Continued)

capable of transmitting a signal of a predetermined optical polarization in a direction from its input end toward its output end, and to reject all signals in a direction from its output end to its input end.

15 Claims, 3 Drawing Sheets

Related U.S. Application Data

(60) Provisional application No. 61/075,755, filed on Jun. 26, 2008.

(56) References Cited

U.S. PATENT DOCUMENTS

| | | | |
|---|---|---|---|
| 6,404,789 B1 | 6/2002 | Kopp et al. | |
| 6,411,635 B1 | 6/2002 | Kopp et al. | |
| 6,671,293 B2 | 12/2003 | Kopp et al. | |
| 6,678,297 B2 | 1/2004 | Kopp et al. | |
| 6,721,469 B2 | 4/2004 | Kopp et al. | |
| 6,741,631 B2 | 5/2004 | Kopp et al. | |
| 6,744,943 B2 | 6/2004 | Kopp et al. | |
| 6,792,169 B2 | 9/2004 | Kopp et al. | |
| 6,839,486 B2 | 1/2005 | Kopp et al. | |
| 6,875,276 B2 | 4/2005 | Shibayev et al. | |
| 6,891,992 B2 | 5/2005 | Kopp et al. | |
| 6,925,230 B2 | 8/2005 | Kopp et al. | |
| 7,009,679 B2 | 3/2006 | Kopp et al. | |
| 7,095,911 B2 | 8/2006 | Kopp et al. | |
| 7,142,280 B2 | 11/2006 | Kopp et al. | |
| 7,242,702 B2 | 7/2007 | Kopp et al. | |
| 7,308,173 B2 | 12/2007 | Kopp et al. | |
| 7,336,858 B1 | 2/2008 | Moore | |
| 7,463,800 B2 | 12/2008 | Kopp et al. | |
| 7,983,515 B2 | 7/2011 | Zhang et al. | |
| 8,218,921 B2 | 7/2012 | Kopp et al. | |
| 8,326,099 B2 | 12/2012 | Singer et al. | |
| 8,457,456 B2 | 6/2013 | Kopp et al. | |
| 8,463,094 B2 | 6/2013 | Kopp et al. | |
| 8,712,199 B2 | 4/2014 | Kopp et al. | |
| 8,948,547 B2 | 2/2015 | Kopp | |
| 9,766,407 B2 | 9/2017 | Weiner et al. | |
| 9,810,845 B2 | 11/2017 | Kopp | |
| 9,817,191 B2 | 11/2017 | Kopp et al. | |
| 9,851,510 B2 | 12/2017 | Kopp | |
| 9,857,536 B2 | 1/2018 | Kopp et al. | |
| 9,885,825 B2 | 2/2018 | Kopp | |
| 9,921,355 B2 | 3/2018 | Weiner et al. | |
| 9,983,362 B2 | 5/2018 | Kopp et al. | |
| 10,078,019 B2 | 9/2018 | Kopp et al. | |
| 10,101,536 B2 | 10/2018 | Kopp et al. | |
| 10,126,494 B2 | 11/2018 | Kopp | |
| 10,197,736 B2 | 2/2019 | Kopp | |
| 2002/0003827 A1 | 1/2002 | Genack et al. | |
| 2002/0069676 A1 | 6/2002 | Kopp et al. | |
| 2002/0118710 A1 | 8/2002 | Kopp et al. | |
| 2002/0172461 A1 | 11/2002 | Singer et al. | |
| 2003/0118265 A1* | 6/2003 | Kopp | G02B 6/02085 385/11 |
| 2003/0118285 A1 | 6/2003 | Kopp et al. | |
| 2004/0145704 A1 | 7/2004 | Kopp et al. | |
| 2005/0008308 A1* | 1/2005 | Bita | B82Y 20/00 385/123 |
| 2005/0094144 A1* | 5/2005 | Gibbs | G01N 21/21 356/365 |
| 2008/0098772 A1 | 5/2008 | Kopp et al. | |
| 2009/0324159 A1 | 12/2009 | Kopp et al. | |
| 2010/0002983 A1 | 1/2010 | Kopp et al. | |
| 2010/0158438 A1 | 6/2010 | Churikov et al. | |
| 2011/0292676 A1 | 12/2011 | Weiner et al. | |
| 2011/0293219 A1 | 12/2011 | Weiner et al. | |
| 2012/0189241 A1 | 7/2012 | Kopp et al. | |
| 2012/0257857 A1 | 10/2012 | Kopp et al. | |
| 2013/0121641 A1 | 5/2013 | Singer et al. | |
| 2013/0188174 A1 | 7/2013 | Kopp et al. | |
| 2013/0188175 A1 | 7/2013 | Kopp et al. | |
| 2013/0216184 A1 | 8/2013 | Kopp et al. | |
| 2015/0212274 A1 | 7/2015 | Kopp | |
| 2017/0219774 A1 | 8/2017 | Kopp | |
| 2017/0268937 A1 | 9/2017 | Kopp et al. | |
| 2017/0269277 A1 | 9/2017 | Weiner et al. | |
| 2017/0269293 A1 | 9/2017 | Churikov et al. | |
| 2017/0276867 A1 | 9/2017 | Kopp | |
| 2017/0336570 A1 | 11/2017 | Kopp et al. | |
| 2018/0172916 A1 | 6/2018 | Kopp et al. | |
| 2019/0025501 A1 | 1/2019 | Kopp | |

FOREIGN PATENT DOCUMENTS

| | | |
|---|---|---|
| WO | WO 2006/046947 A2 | 5/2006 |
| WO | WO 2008/080174 A1 | 7/2008 |
| WO | WO 2009/158661 A2 | 12/2009 |
| WO | WO 2010/009101 A2 | 1/2010 |
| WO | WO 2010/071861 A2 | 6/2010 |
| WO | WO 2017/053479 A1 | 3/2017 |
| WO | WO 2017/100667 A1 | 6/2017 |
| WO | WO 2018/085435 A1 | 5/2018 |
| WO | WO 2018/227008 A1 | 12/2018 |

OTHER PUBLICATIONS

P. De Heyn, V.I. Kopp, S. A. Srinivasan, P. Verheyen, J. Park, M.S. Wlodawski, J. Singer, D. Neugroschl, B. Snyder, S. Balakrishnan, G. Lepage, M. Pantouvaki, P. Absil1 , and J. Van Campenhout, "Ultra-dense 16x56Gb/s NRZ GeSi EAM-PD arrays coupled to multicore fiber for short-reach 896Gb/s optical links," 2017 Optical Fiber Communications Conference and Exhibition (OFC), Los Angeles, CA, Optical Society of America, pp. 1-3 (2017).

V.I. Kopp, J. Park, M.S. Wlodawski, J. Singer, D. Neugroschl, P. de Heyn, B. Snyder, J. Van Campenhout, and P. Absil, "Flexible, Multi-channel, Ultra-dense Optical Interface for Silicon Photonics," ECOC 2016; 42nd European Conference on Optical Communications, Dusseldorf, Germany, 755-757 (2016).

P. Liao, M. Sakib, F. Lou, J. Park, M. Wlodawski, V.I. Kopp, D. Neugroschl, and O. Liboiron-Ladouceur, "Ultradense Silicon Photonic Interface for Optical Interconnection," in IEEE Photonics Technology Letters, vol. 27, No. 7, pp. 725-728 (2015).

V.I. Kopp, J. Park, M. Wlodawski, E. Hubner, J. Singer, D. Neugroschl, A. Z. Genack, P. Dumon, J. Van Campenhout, and P. Absil, "Two-Dimensional, 37-Channel, High-Bandwidth, Ultra-Dense Silicon Photonics Optical Interface," Journal of Lightwave Technology, vol. 33, No. 3, pp. 653-656 (2015).

V. I. Kopp, J. Park, M. S. Wlodawski, E. Hubner, J. Singer, D. Neugroschl, and A. Z. Genack, "Vanishing Core Optical Waveguides for Coupling, Amplification, Sensing, and Polarization Control," in Advanced Photonics, OSA Technical Digest (online), paper SoW1B.3, Optical Society of America, pp. 1-3 (2014).

M. Wlodawski, V.I. Kopp, J. Park, J. Singer, E. Hubner, D. Neugroschl, N. Chao, and A.Z. Genack, "A new generation of ultra-dense optical I/O for silicon photonics," Proceedings of SPIE—the International Society for Optical Engineering. vol. 8990, 899006, pp. 1-12 (2014).

V.I. Kopp, J. Park, M. Wlodawski, J. Singer, and D. Neugroschl, "Polarization maintaining, high-power and high-efficiency (6+1)×1 pump/signal combiner", Proc. SPIE 8961, Fiber Lasers XI: Technology, Systems, and Applications, 89612N, pp. 1-6 (2014).

V. I. Kopp, J. Park, M. Wlodawski, J. Singer, D. Neugroschl and A. Z. Genack, "Chiral Fibers: Microformed Optical Waveguides for Polarization Control, Sensing, Coupling, Amplification, and Switching," in Journal of Lightwave Technology, vol. 32, No. 4, pp. 605-613 (2014).

D. Neugroschl, J. Park, M. Wlodawski, J. Singer, and V.I. Kopp, "High-efficiency (6+1)×1 combiner for high power fiber lasers and amplifiers", Proc. SPIE 8601, Fiber Lasers X: Technology, Systems, and Applications, 860139, pp. 1-6 (2013).

(56) References Cited

OTHER PUBLICATIONS

V. I. Kopp, J. Park, M. Wlodawski, J. Singer, D. Neugroschl and A. Z. Genack, "Pitch Reducing Optical Fiber Array and multicore fiber for space-division multiplexing," 2013 IEEE Photonics Society Summer Topical Meeting Series, Waikoloa, HI, pp. 99-100 (2013).

V. I. Kopp, J. Park, M. Wlodawski, J. Singer, D. Neugroschl and A. Z. Genack, "Pitch Reducing Optical Fiber Array for dense optical interconnect," IEEE Avionics, Fiber-Optics and Photonics Digest CD, Cocoa Beach, FL, 2012, pp. 48-49.

J. Park, M.S. Wlodawski, J. Singer, D. Neugroschl, A. Z. Genack, V.I. Kopp, "Temperature and Pressure Sensors Based on Chiral Fibers", Proc. Of SPIE 8370, 837008, pp. 1-8 (2012).

F.E. Doany, B.G. Lee, S.Assefa, W.M.J. Green, M. Yang, C.L. Schow, C.V. Jahnes, S. Zhang, J. Singer, V.I. Kopp, J.A. Kash, and Y.A. Vlasov, "Multichannel High-Bandwidth Coupling of Ultra-Dense Silicon Photonic Waveguide Array to Standard-Pitch Fiber Array", IEEE J. Of Lightwave Technology, 29, 4, 475-482 (2011).

V.I. Kopp, J. Singer, D. Neugroschl, and A.Z. Genack, "Chiral fiber sensors for harsh environments", Proc. SPIE 8028, Fiber Optic Sensors and Applications VIII, 802803, pp. 1-8 (2011).

V.I. Kopp and A.Z. Genack, "Chiral Fibres: Adding Twist", Nature Photonics 5, 470-472 (2011).

V.I. Kopp, V.M. Churikov, J. Singer, D. Neugroschl, and A.Z. Genack, "Chiral fiber sensors," Proc. SPIE 7677, Fiber Optic Sensors and Applications VII, 76770U, pp. 1-6 (2010).

V.M. Churikov, V.I. Kopp, and A.Z. Genack, "Chiral diffraction gratings in twisted microstructured fibers", Opt. Lett. 35(3), 342-344 (2010).

S. Guillemet, D. Kinet, A. Bertrand, Y. Hernandez, and D. Giannone, "High Power All-In-Fibre Linearly Polarized Laser Using Chiral Grating-Based Polarizer", 4th EPS-QEOD Europhoton Conference, 1 page (2010).

C. R. Doerr, L. Zhang, P. J. Winzer, "Monolithic InP Multi-Wavelength Coherent Receiver", Proc. OFC, paper PDPB1, Optical Society of America, pp. 1-3, (2010).

S. Guillemet, D. Kinet, A. Bertrand, Y. Hernandez, and D. Giannone, "Experimental study and comparison of three innovative high power CW polarised all-in-fibre laser designs", IEEE Photonics Benelux Chapter, 141-144 (2010).

H. Henschel, S.K. Hoeffgen, J. Kuhnhenn and U. Weinand, "High Radiation Sensitivity of Chiral Long Period Gratings", IEEE Transaction on Nuclear Science, 57, 5, 2915-2922 (2010).

V.M. Churikov, V.I. Kopp, A.Z. Genack, "Dual-twist fiber long period gratings", Proceedings of SPIE 7212, 72120H, pp. 1-9 (2009).

V.I. Kopp, G. Zhang, S. Zhang, A.Z. Genack, and D. Neugroschl, "Chiral fiber optical isolator", Proceedings of SPIE 7195, 71950B, pp. 1-8 (2009).

S. Zhang, V.I. Kopp, V. Churikov, and G. Zhang, "Panda-based chiral in-fiber polarizer", Proceedings of SPIE 7212, 72120D, pp. 1-8 (2009).

G. Shvets, S. Trendafilov, V.I. Kopp, D. Neugroschl, and A.Z. Genack, "Polarization properties of chiral fiber gratings", J. Opt. A: Pure Appl. Opt. 11, 074007, pp. 1-10 (2009).

C.R. Doerr, L. Zhang, L. Buhl, V.I. Kopp, D. Neugroschl, and G. Weiner, "Tapered Dual-Core Fiber for Efficient and Robust Coupling to InP Photonic Integrated Circuits", Proc. OFC, Optical Society of America, pp. 1-3 (2009).

D. Neugroschl, V.I. Kopp, J. Singer, and G. Zhang, "Vanishing-core tapered coupler for interconnect applications", Proceedings of SPIE 7221, 72210G, pp. 1-8 (2009).

V. I. Kopp, V. M. Churikov, and A. Z. Genack, "Chiral Fiber Gratings Sense the Environment", Laser Focus World, 76-79 (2008).

V. I. Kopp and A. Z. Genack, "Chiral fibers", Chapter 12 in Specialty Optical Fibers Handbook edited by Alexis Mendez and T. F. Morse. Academic Press, 401-427 (2007).

V. I. Kopp, V. M. Churikov, G. Zhang, J. Singer, C. W. Draper, N. Chao, D. Neugroschl, and A.Z. Genack, "Single- and double-helix chiral fiber sensors", J. Opt. Soc. Am. B 24(10), A48-A52 (2007).

V. I. Kopp, V. M. Churikov, G. Zhang, J. Singer, C. W. Draper, N. Chao, D. Neugroschl, and A.Z. Genack, "Chiral fiber gratings: perspectives and challenges for sensing applications", (Invited Paper), Proceedings of SPIE 6619, 66190B, pp. 1-8 (2007).

V. I. Kopp, V. M. Churikov, and A. Z. Genack, "Synchronization of optical polarization conversion and scattering in chiral fibers", Optics Letters 31(5), 571-573 (2006).

A. Z. Genack, V. I. Kopp, V. M. Churikov, J. Singer, N. Chao, and D. Neugroschl, "From planar to fiber chiral gratings", (Invited Paper), Proceedings of SPIE 5741, 90-97 (2005).

A. Z. Genack, V. I. Kopp, V. M. Churikov, J. Singer, N. Chao, and D. Neugroschl, "Chiral fiber Bragg gratings", Proceedings of SPIE 5508, 57, pp. 1-8 (2004).

V.I. Kopp, V.M. Churikov, J. Singer, N. Chao, D. Neugroschl, and A. Z. Genack, "Chiral fiber gratings", Science 305, 74-75 (2004).

V. I. Kopp, A. Z. Genack, V. M. Churikov, Jonathan Singer and Norman Chao, "Chiral Fiber Gratings Polarize Light", Photonics Spectra 38, 78-79 (2004).

V.I. Kopp, R. Bose, and A.Z. Genack, "Transmission through chiral twist defects in anisotropic periodic structures", Optics Letters 28(5), 349-351 (2003).

P.V. Shibaev, V.I. Kopp, and A.Z. Genack, "Photonic materials based on mixtures of cholesteric liquid crystals with polymers", J. Phys. Chem. B.107, 6961-6964 (2003).

V.I. Kopp, Z.—Q. Zhang and A.Z. Genack, "Lasing in chiral photonic structures", Progress in Quantum Electronics 27, 369-416 (2003).

V.I. Kopp and A.Z. Genack, "Double-helix chiral fibers", Optics Letters 28(20), 1876-1878 (2003).

P.V. Shibaev, K. Tang, A.Z. Genack, V. Kopp, and M. M. Green, "Lasing from a stiff chain polymeric lyotropic cholesteric liquid crystal", Macromolecules 35(8), 3022-3025 (2002).

V.I. Kopp and A.Z. Genack, "Twist defect in chiral photonic structures", Physical Review Letters 89(3), 033901, pp. 1-4 (2002).

V. I. Kopp, P. V. Shibaev, R. Bose, and A. Z. Genack, "Anisotropic photonic-bandgap structures", Proceedings of SPIE 4655, 141-149 (2002).

V.I. Kopp, Z.—Q. Zhang and A.Z. Genack, "Large coherence area thin-film photonic stop-band lasers", Physical Review Letters 86(9), 1753-1756 (2001).

V. I. Kopp and A. Z. Genack, "Density of states and lasing at the edge of a photonic stop band in dye-doped cholesteric liquid crystals", Proceedings of SPIE 3623, 71-79 (1999).

V.I. Kopp and A.Z. Genack, "Lasing at the edge of a photonic stop band in cholesteric liquid crystals", IEEE LEOS 13, No. 2, 8-10 (1999).

V.I. Kopp, B.Fan, H.K.M. Vithana, and A.Z. Genack, "Low-threshold lasing at the edge of a photonic stop band in cholesteric liquid crystals", Optics Letters 23(21), 1707-1709 (1998).

B.G. Lee, F.E.Doany, S. Assefa, W.M.J. Green, M. Yang, C.L. Schow, C.V. Jahnes, S. Zhang, J. Singer, V.I. Kopp, J.A. Kash, and Y.A. Vlasov, "20-um-Pitch Eight-Channel Monolithic Fiber Array Coupling 160 Gb/s/Channel to Silicon Nanophotonic Chip", Proc. OFC, PDPA4, Optical Society of America, pp. 1-3, (2010).

International Search Report and Written Opinion of PCT/US2009/048932 dated Feb. 2, 2010 in 6 pages.

Extended European Search Report of EP Appl. No. 09771192.3 dated Jul. 5, 2011 in 10 pages.

\* cited by examiner

US 10,353,227 B2

OPTICAL CHIRAL FIBER ISOLATOR AND METHOD OF FABRICATION THEREOF

CROSS REFERENCE TO RELATED APPLICATIONS

The present patent application is a continuation of U.S. application Ser. No. 12/492,984, entitled "Optical Chiral Fiber Isolator and Method of Fabrication Thereof," filed Jun. 26, 2009, which claims priority benefit from the commonly assigned U.S. provisional patent application 61/075,755, entitled "Optical Chiral Fiber Isolator and Method of Fabrication Thereof", filed Jun. 26, 2008.

FIELD OF THE INVENTION

The present invention relates generally to optical isolators, and more particularly to an in-fiber optical chiral fiber isolator that overcomes the drawbacks of all previously known polarization-sensitive optical/Faraday isolators.

BACKGROUND OF THE INVENTION

Optical isolators (sometimes called "optical diodes"), and particularly polarization-dependent optical isolators (also referred to as "Faraday isolators") are commonly utilized optical components which allow the transmission of light in only one predetermined direction, in essence serving is a one-way light valve, permitting radiation to pass through one way and not the other. Optical isolators are typically used to prevent back reflections/unwanted feedback into an optical oscillator, such as a laser cavity. The operation of the device depends on the Faraday effect achieved by the optical isolator's main component—the Faraday rotator. In summary, a magnetic field, B, applied to a Faraday rotator causes a rotation in the polarization of the light passing through the rotator at a predefined angle β, due to the Faraday effect. The value of this angle of rotation β, is determined by the following expression:

$$\beta = \nu Bd,$$

where, ν is the Verdet constant of the material (amorphous or crystalline; solid, liquid, or gaseous) of which the rotator is made, and d is the length of the rotator.

Referring now to Prior Art FIG. 3, a conventional optical "Faraday" isolator 300 is shown by way of example. The prior art isolator 300, is typically positioned between two optical elements 302a at its first end A, and 302b at its second end B. One or both of the elements 302a, 302b may be optical fibers, and/or other optical devices/components. The prior art isolator 300 includes an input an input linear polarizer 304a at first end A, a magnetic rotator 306 based on the Faraday effect (e.g., a Faraday rotator), and an output linear polarizer 304b whose pass axis is rotated 45° relative to the input polarizer 304a. A magnetic field 308 surrounding the rotator 306 is chosen for the wavelength of the desirable light so that the plane of polarization within the rotator 306 is rotated by 45° into the output polarizer 304b pass direction (toward second end B).

Light 310 travelling in the forward direction between ends A and B becomes polarized linearly by the input polarizer 304a so that only light 314a of a desired polarization orientation exits the input polarizer 304a and enters the Faraday rotator 306 (with the other undesired polarization component 312 of the input light 310 being dissipated, deflected, or otherwise prevented from exiting the input polarizer 304a into the rotator 306). The Faraday rotator 306, under the influence of the predetermined magnetic field 308, then rotates the polarization of the light 314a by 45 degrees to produce rotated polarized light 314b at its output, which then enters the output polarizer 304b and then freely passes therethrough to the optical element 302b.

Light 316 travelling in the backward direction (from end B to end A) becomes linearly polarized at 45 degrees by the output polarizer 304b to produce the polarized light 320 (with the other undesired polarization component 318 of the backward traveling light 316 being dissipated, deflected, or otherwise prevented from exiting the output polarizer 304b into the rotator 306). The Faraday rotator will again rotate the polarization of the polarized light 320 by 45 degrees to produce the rotated polarized light 322 at the interface between the rotator 306 and the input polarizer 304a. This means that the light 322 is polarized orthogonally with respect to the polarization orientation of the input polarizer 304a, and thus the light 322 is dissipated, deflected, or otherwise prevented from exiting the input polarizer 304a toward the optical element 302a.

While in essence, the above-described commonly known prior art optical isolator generally serves its purpose well in most commercial/industrial/scientific applications, such isolators suffer from a number of significant disadvantages. First, the input and output polarizers, and especially the Faraday rotator are "bulk" optical components that are quite large as compared to sizes of optical fibers to which they are most often connected. As separate bulk optical components, they must be properly aligned and tuned prior to and during installation.

Conventional optical isolators are also relatively expensive to manufacture, use, maintain and/or to troubleshoot. Furthermore, there are a total of six points of contact interfaces between the input optical element, the input polarizer, the rotator, the output polarizer, and the output optical element—each of these interface points are a potential source of signal loss and/or damage for the entry/exit interfaces of each prior art isolator elements. While attempts to address this issue, by coating each glass interface surface with anti-reflective coating or by tilting the optical components to form sufficient angles between interface surfaces to reduce/avoid back reflection, from an optical power-handling viewpoint, the interfaces where light signals exit and enter glass surfaces remain the most likely candidates for damage from the signals. Furthermore, if used in systems with unpolarized light signals conventional isolators must be connected to yet additional separate bulk polarization components on each end. Finally, the multi-element construction and need to maintain proper alignment between all the elements makes conventional optical isolators unstable and unreliable in conditions where such isolators may be subjected to physical stress and/or to temperature variations.

It would thus be desirable to provide an optical isolator device of a substantially in-fiber physical profile to facilitate installation and utilization thereof. It would also be desirable to provide an in-fiber optical isolator device that is preconfigured with desired characteristics and that does not require tuning. It would moreover be desirable to provide an in-fiber optical isolator device of high physical and thermal stability, and resistance to effects of physical stress and/or temperature variations on the performance thereof. It would also be desirable to provide an in-fiber optical isolator device without undesirable and damage-prone inter-element interface points. It would additionally be desirable to provide an in-fiber optical isolator device that is easy and inexpensive to manufacture, install, use, and maintain.

BRIEF DESCRIPTION OF THE DRAWINGS

In the drawings, wherein like reference characters denote corresponding or similar elements throughout the various figures.

SUMMARY OF THE INVENTION

Figure 1A:
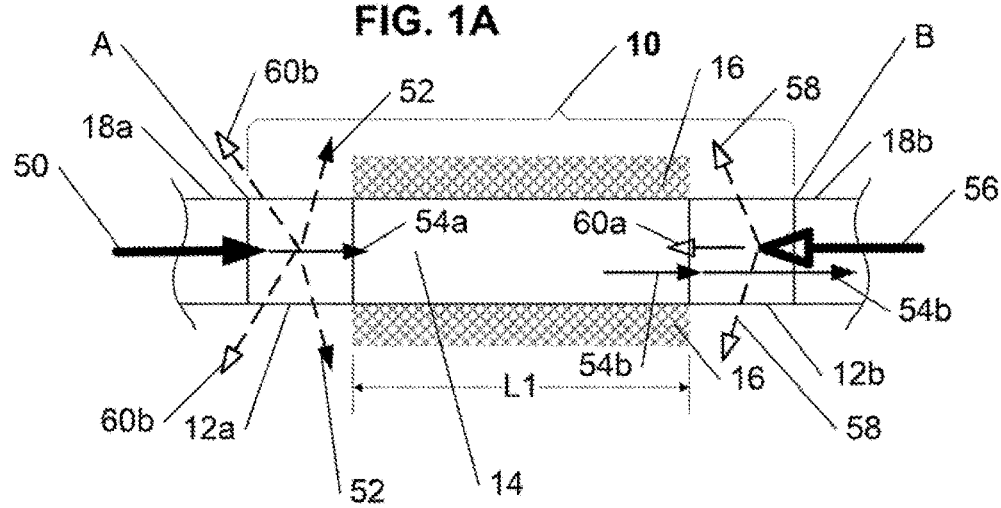
FIG. 1A is a schematic diagram of a side view of a first exemplary embodiment of the optical chiral fiber isolator of the present invention, shown, by way of example, in utilization thereof.

The present invention provides an optical in-fiber chiral fiber isolator that is capable of transmitting a signal of a predetermined optical polarization in a forward direction therethrough, while rejecting all signals traveling in a backward direction therethrough, and to a method of fabrication thereof.

In one exemplary embodiment, the inventive optical chiral fiber isolator includes a chiral magneto-optical fiber having a helical pitch profile, a birefringence profile, and an effective Verdet constant profile, at least a portion of which is exposed to a magnetic field of a predetermined magnetic field profile (for example, generated by a proximal magnetic field source), where the magnetic field profile, the chiral pitch profile, the birefringence profile, and the effective Verdet constant profile, are selected and configured such that the inventive isolator is capable of transmitting a signal of a predetermined optical polarization in the direction from its input end toward its output end, and to reject all signals in the direction from its output end to its input end.

The inventive optical in-fiber chiral fiber isolator addresses and overcomes the flaws, disadvantages and shortcomings of all previously known polarization sensitive optical isolators at least because the optical in-fiber chiral fiber isolator of the present invention advantageously:

- comprises a substantially in-fiber (i.e. not "bulk") physical profile that facilitates fabrication, installation and utilization thereof;
- can be readily preconfigured with desired characteristics/parameters without any need for adjustment and/or tuning;
- has a high degree of physical and thermal stability, and resistance to effects of physical stress and/or temperature variations on the performance thereof;
- lacks the undesirable and damage-prone inter-element interface points of previously known bulk-profile optical isolators; and
- is easy and relatively inexpensive to manufacture, install, use, and maintain.

In essence, the inventive optical in-fiber chiral fiber isolator accomplishes the above goals by utilizing specially configured "in-fiber" chiral fiber elements for each component thereof that enable the novel isolator to achieve a high degree of performance, while maintaining a number of significant advantages over previously known bulk device optical isolator solutions.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

DETAILED DESCRIPTION OF THE PREFERRED EMBODIMENTS

The present invention is directed to a optical in-fiber chiral fiber isolator capable of transmitting a signal (e.g., light) of a predetermined desired optical polarization in a forward direction therethrough, while rejecting all signals traveling in a backward direction therethrough.

In summary, in its first exemplary embodiment, the optical chiral fiber isolator includes a chiral magneto-optical fiber having a helical pitch profile, a birefringence profile, and an effective Verdet constant profile, at least a portion of which is exposed to a magnetic field of a predetermined magnetic field profile (generated by a proximal magnetic field source), where the magnetic field profile, the chiral pitch profile, the birefringence profile, and the effective Verdet constant profile are selected and configured such that the inventive isolator is capable of transmitting a signal of a predetermined optical polarization in a direction from its input end toward its output end, and to reject all signals in a direction from its output end to its input end.

Prior to discussing the various drawings figures, it should be noted that that relative sizes and dimensions of the various inventive apparatus components are shown by way of example only and may readily be altered as a matter of necessity or design choice, without departing from the spirit of the invention. Similarly, it should be noted that orientations of the various arrows in the drawings figures indicating scattered or otherwise dissipated polarized signal components are not in any way intended to show actual direction of polarized signal propagation, and are only meant to illustrate that those specific signal components are rejected by the corresponding inventive optical isolator component.

Referring now to FIG. 1A, a first embodiment of the inventive optical chiral fiber (hereinafter "OCF") isolator 10 is shown by way of example. The OCF isolator 10, is typically positioned between two optical elements—element 18a at its first end A, and element 18b at its second end B. One or both of the elements 18a, 18b may be optical fibers, and/or other optical devices/components. The inventive isolator 10 includes an input linear polarizer 12a at its first end A, an output linear polarizer 12b whose pass axis is rotated 45° relative to the input polarizer 12a at its second end B, and a non-reciprocal polarization ("NRP") converter 14 (essentially comprising the functionality of a Faraday rotator) positioned between the input and output polarizers 12a, 12b respectively.

Each of the polarizers 12a, 12b is preferably an in-fiber polarizer configured to pass signals of a one particular (i.e., desired) polarization, while scattering or otherwise rejecting signals of another polarization (e.g., that is orthogonal to the desired polarization). By way of example, any of the in-fiber polarizers shown and described in the commonly assigned U.S. Patent "Chiral In-Fiber Adjustable Polarizer Apparatus and Method", (U.S. Pat. No. 6,721,469), and/or the commonly assigned U.S. Patent "Chiral In-Fiber Polarizer Apparatus and Method", (U.S. Pat. No. 7,095,911), both of which are hereby incorporated herein in their entirety.

The NRP converter 14 preferably comprises a chiral magneto-optical fiber having a predefined chiral (e.g., helical) pitch profile, a predefined birefringence profile, and an effective predefined Verdet constant profile along its length L1. A magnetic field source (such as a rare earth or other magnet) positioned proximal thereto exposes at least a longitudinal portion of the NRP converter 14 along length L1 to a magnetic field 16 of a predetermined magnetic field profile. Both L1 and the magnetic field 16 profile are preferably selected and configured, taking into account the desirable signal wavelength so that the plane of polarization within the NRP converter 14 is rotated by 45° into the output polarizer 12*b* pass direction (toward the second end B). It should also be noted that due to the fact that the NRP converter 14 is of the same size as the rest of the elements (i.e. of an optical fiber). The source of the magnetic field 16 is significantly more compact that magnetic field sources used in previously known bulk isolators.

Preferably, the magnetic field profile, the chiral pitch profile, the birefringence profile, and the effective Verdet constant profile for the NRP converter 14 are selected and configured such that a polarized signal 50 travelling in the forward direction between ends A and B becomes polarized by the input polarizer 12*a* into two differently oriented (or traveling at different speeds—i.e. fast or slow) polarization components, so that only a signal 54*a* of a desired polarization exits the input polarizer 12*a* and enters the NRP converter 14 (with the other undesired polarization component 52 of the input signal 50 being scattered or otherwise prevented from exiting the input polarizer 12*a* into the NRP converter 14). The NRP converter 14, under the influence of the predetermined magnetic field 16, then rotates the polarization of the signal 54*a* by 45 degrees to produce rotated polarized signal 54*b* at its output, which then enters the output polarizer 12*b* and thereafter freely passes therethrough to the optical element 18*b*.

Light 56 travelling in the backward direction (from end B to end A) becomes polarized at 45 degrees by the output polarizer 12*b* to produce the polarized signal 60*a* (with the other undesired polarization component 58 of the backward traveling signal 56 being scattered or otherwise prevented from exiting the output polarizer 12*b* into the NRP converter 14). The NRP converter 14 will again rotate the polarization of the polarized signal 60*a* by 45 degrees to produce a rotated polarized signal 60*b* at the interface between the NRP converter 14 and the input polarizer 12*a*. As a result, because the signal 60*b* is polarized orthogonally with respect to the polarization orientation of the input polarizer 12*a*, the signal 60*b* is scattered or otherwise prevented from exiting the input polarizer 12*a* toward the optical element 18*a*.

The above description of the inventive optical chiral fiber isolator 10, presumes that the signals 50, 54*b*, and 56 entering/exiting the isolator are already polarized in a predefined polarization (e.g., elliptical, linear, etc.). In an alternate embodiment of the invention shown in FIG. 1B, the inventive isolator 10 may be advantageously provided with one or two (as may be desired or necessary) polarization converters 20*a* (positioned between the element 18*a* and the end A of the NRP converter 14), and polarization converter 20*b* (positioned between the end A of the NRP converter 14 and the element 18*b*. When an unpolarized signal 62 enters the converter 20*a*, it becomes converted to a polarized signal 50 with two orthogonal (or fast/slow) particular polarization components prior to entering the polarizer 12*a* which rejects the undesired polarization component and passes the other one therethrough to the NRP converted 14. Similarly, an unpolarized signal 64 entering the converter 20*b*, is converted to the polarized signal 56 before proceeding further into the isolator 10 and eventually being rejected.

Figure 1B:
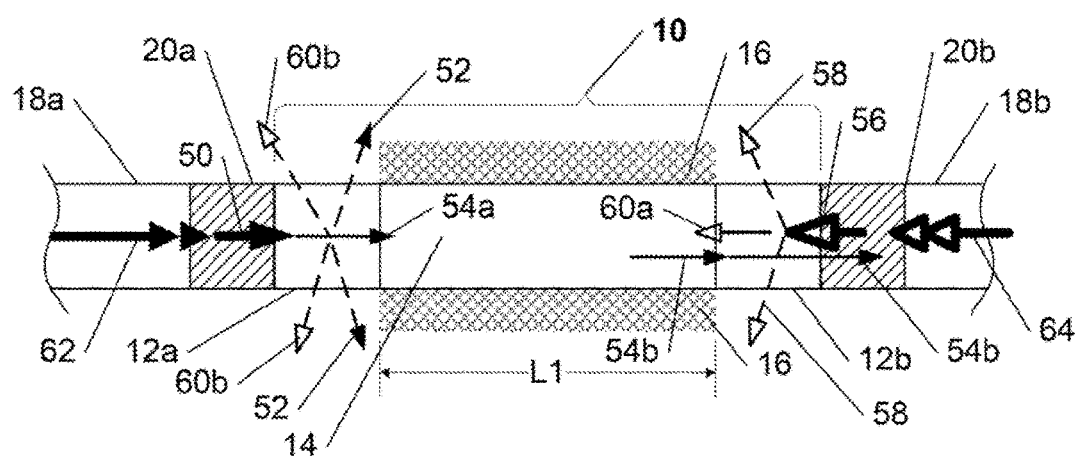
FIG. 1B is a schematic diagram of a side view of an alternate exemplary embodiment of the inventive optical chiral fiber isolator of FIG. 1A which includes additional input and output polarization elements, shown, by way of example, in utilization thereof.

While there are a variety of advantageous techniques which may be utilized to fabricate the inventive isolator 10 of FIGS. 1A, 1B, it should be noted that because the sequentially positioned elements thereof are in-fiber (other than the magnetic field source which may be readily provided after initial fabrication), it may be advantageous to fabricate the entire novel optical isolator device during a single chiral fiber component fabrication process (e.g., through a carefully controlled combination of twisting/drawing/tapering stages), either (1) in multiple stages/passes in which a portion of the novel isolator is fabricated during each step (selected to minimize the chances that the perform will be damaged during certain fabrication sequences); or (2) in a single stage/pass, in which the entire inventive optical chiral fiber isolator device is fabricated in accordance with a predefined fabrication protocol from a single perform (which may comprise multiple pre-spliced performs).

Advantageously, the chiral fiber component fabrication techniques shown and described in greater detail in the commonly assigned co-pending U.S. patent applications entitled "Chiral Fiber Grating Device and Method of Fabrication Thereof", Ser. No. 11/646,130, and "Method for Fabricating an Optical Fiber Assembly Having Optical Fibers of Different Diameters", Ser. No. 11/544,416, both of which are hereby incorporated herein in their entirety.

Figure 2:
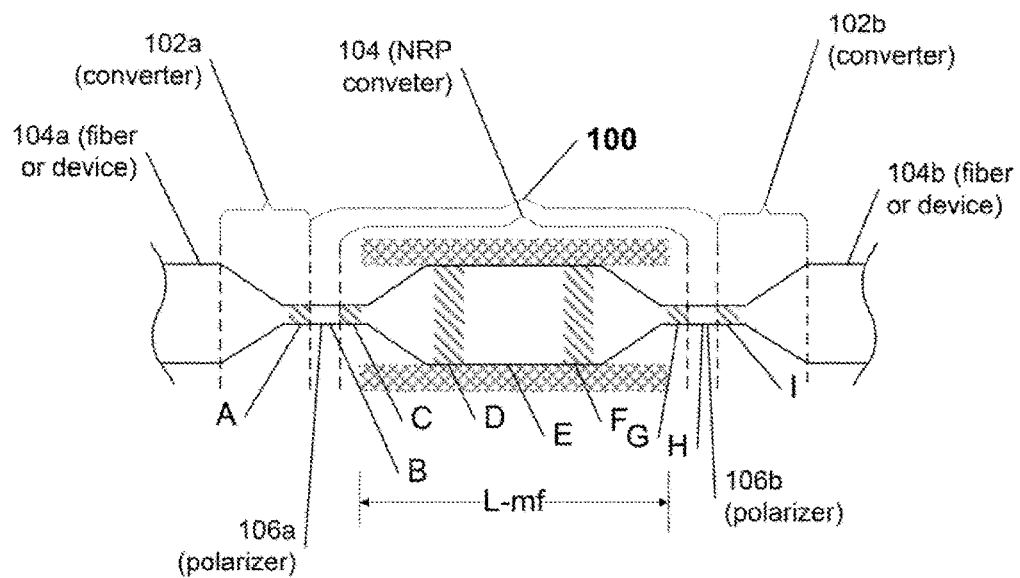
FIG. 2 is a schematic diagram of a side view of a second exemplary embodiment of the optical chiral fiber isolator of the present invention, that also illustrates an advantageous embodiment of a method of fabrication thereof.
Figure 3:
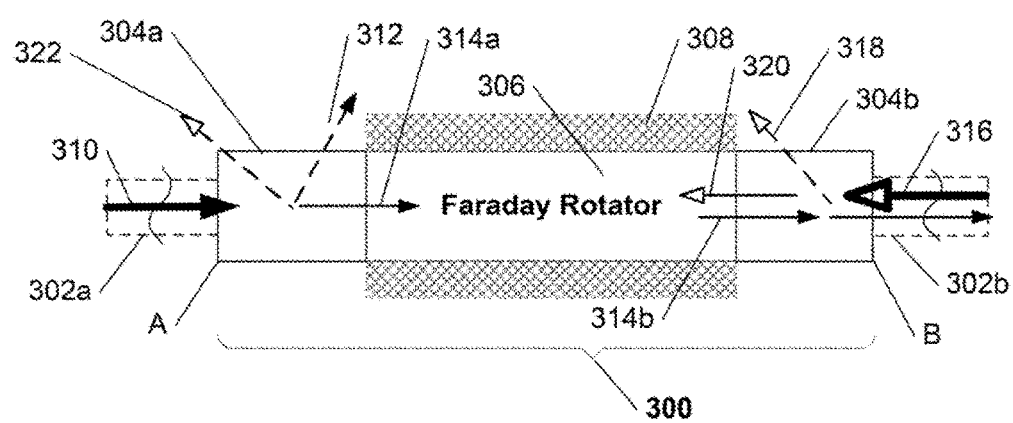
FIG. 3 (Prior Art) is a schematic diagram of a side view of an exemplary previously known optical Faraday isolator.

Referring now to FIG. 2, a second exemplary embodiment of the novel optical chiral fiber isolator 100 is shown positioned between two optical elements 104*a* and 104*b*, with a centrally positioned NRP converter 104 flanked on each side by polarizers 106*a*, 106*bm*, and shown with optional converters 102*a* and 102*b* at each end of the isolator 100, that have all been fabricated using one or more of the above-described novel fabrication techniques which comprise a series of twisting (at specified rates)/drawing/tapering procedures selected and configured in accordance with a desired fabrication protocol. The twisting portions of the fabrication protocol are of particular importance as the helical (chiral) pitch profiles of the various sections of the novel isolator 10, are determined by the twist acceleration, uniformity and/or deceleration. The Verdet constant of an NRP component 104 is readily determined by selection of a specific magneto-optic chiral fiber perform having a non-symmetrical cross section (for example configured to have a "vanishing core" when drawn). A magnetic field, surrounding the NRP converter 104, of length L-mf is also shown by way of example to illustrate that the length of the magnetic filed may vary from the length of the NRP converter 104.

By way of example, an exemplary embodiment of a novel fabrication protocol, that may be readily utilized to fabricate the novel optical chiral fiber isolator, is described in greater detail below. The fabrication process begins with a taper of a perform down to a region A in which the twist is accelerated toward a region B, resulting in a helical pitch profile in the region A that becomes shorter from left to right. Because region B represents the polarizer 106*a*, its is preferable that the chiral fiber portion in region B is of high birefringence, and that it is uniformly twisted with a shortest pitch, with respect to the rest of the isolator 100.

When region C is reached, the twist is decelerated until region C ends, resulting in a helical pitch profile in the region C to become longer from left to right. The twist is then kept uniform at the shortest pitch as the chiral fiber is tapered up until proximal to the region D. After a taper up to region D, the twist in region D is accelerated causing the helical pitch of this section of the isolator to become shorter from left to right, and is then kept uniform at the shortest pitch through a region E, until region F is reached in which the twist is decelerated causing the helical pitch profile of the fiber to become longer from left to right. The twist is then kept uniform at the shortest pitch as the chiral fiber is tapered down until proximal to the region G.

Advantageously, the helical pitch profile in the region composed of regions D-E-F as well as of the regions on either side thereof, is configured such that a slow axis of the fiber region to the left of region D is rotated 45 degrees with respect to the slow axis of the fiber region to the right of region F. Preferably the birefringence of the region of the NRP converter 104 that is exposed to the magnetic filed along the length L-mf, is selected to be of relatively low birefringence. The magnetic field is then able to ensure that linear polarization orientation of the signal traveling through the NRP converter 104 is rotated 45 degrees.

Thereafter, in region G, the twist is accelerated toward a region H, resulting in a helical pitch profile in the region G to become shorter from left to right. Because region H represents the polarizer 106b, its is preferable that the chiral fiber portion in region H is of high birefringence, and that it is uniformly twisted with a shortest pitch, with respect to the rest of the isolator 100. When a region I is reached, the twist is decelerated until region I ends, resulting in a helical pitch profile in the region 10 to become longer from left to right. The twist is then kept uniform at the shortest pitch as the chiral fiber is tapered up until proximal to the interface with the fiber element 104b.

As was previously noted, the above fabrication process may be performed in one or more process stages/passes as a matter of design choice, so, for example, it may be advantageous to conduct the fabrication of the isolator 100 in three stages. At a first stage the regions D-E-F would be fabricated, at a second stage, the regions A-B-C (as well as proximal tapered regions) would be fabricated, followed by a third stage at which regions at which regions G-H-I (as well as proximal tapered regions) would be fabricated, after which the fabrication process would be completed. Of course, in an alternate inventive embodiment, the entire fabrication process may be conducted sequentially in one stage/pass starting with a taper to the left of region A, and then processing regions A to I, followed by the taper region between region I and the optical element 104b.

Thus, while there have been shown and described and pointed out fundamental novel features of the invention as applied to preferred embodiments thereof, it will be understood that various omissions and substitutions and changes in the form and details of the devices and methods illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. It is the intention, therefore, to be limited only as indicated by the scope of the claims appended hereto.

We claim:
1. An optical chiral fiber isolator comprising:
 a chiral magneto-optical fiber, having a first end and a second end, a helical pitch profile, a birefringence profile, and an effective Verdet constant profile; and
 a magnetic field source operable to expose at least a portion of said chiral magneto-optical fiber to a magnetic field of a predetermined magnetic field profile,
 wherein said magnetic field profile, said helical pitch profile, said birefringence profile, and said effective Verdet constant profile are such that said isolator is operable to transmit a signal of a predetermined optical polarization and signal wavelength in a direction from said first end toward said second end, and to reject signals in a direction from said second end toward said first end, and said helical pitch profile has varying pitches which are substantially larger than said signal wavelength.

2. The optical chiral fiber isolator of claim 1, configured to transmit a signal of a predetermined optical polarization in a forward direction and to reject signals in a backward direction, comprising:
 first and second scattering sections operable to scatter the signal of an orthogonal polarization, which is orthogonal to said predetermined optical polarization, in a direction away from a fiber core; and
 a third non-reciprocal polarization conversion section, positioned between said first and said second sections, being operable to:
  convert a backward propagating signal in said direction from said second end toward said first end of said predetermined polarization into a signal of said orthogonal polarization; and
  transmit a forward propagating signal in said direction from said first end toward said second end comprising the same said predetermined polarization upon entry into, and upon exit from said third non-reciprocal polarization conversion section.

3. The optical chiral fiber isolator of claim 2, wherein said third polarization conversion section has magneto-optical properties and has a predetermined conversion length exposed to said magnetic field, wherein said predetermined conversion length is such that said backward propagating signal of said predetermined polarization is converted to a signal of said orthogonal polarization when passing through said third polarization conversion section in the backward direction, and that said forward propagating signal comprises the same said predetermined polarization upon entry into, and upon exit from said third non-reciprocal polarization conversion section when traveling in the forward direction.

4. The optical chiral fiber isolator of claim 2 in which said first and second scattering sections are chiral polarizers.

5. The optical chiral fiber isolator of claim 2 further comprising a fourth conversion section longitudinally proximal to said first scattering section, operable to convert a signal of an input polarization into said signal of said predetermined polarization.

6. The optical chiral fiber isolator of claim 2 further comprising a fifth conversion section longitudinally proximal to said second scattering section operable to convert a signal of said predetermined polarization into a signal of a desired output polarization.

7. The optical chiral fiber isolator of claim 5, in which said input polarization is a linear polarization.

8. The optical chiral fiber isolator of claim 6, in which said output polarization is a linear polarization.

9. The optical chiral fiber isolator of claim 2, in which said predetermined polarization is an elliptical polarization.

10. The optical chiral fiber isolator of claim 3, in which said third non-reciprocal polarization conversion section comprises a predetermined birefringence profile along said third section length.

11. The optical chiral fiber isolator of claim 10 in which said predetermined conversion length, said birefringence profile, said effective Verdet constant profile, a magnitude of said magnetic field, and magnitudes of said magneto-optical properties are such that said third non-reciprocal polarization conversion section is operable to convert a backward propagating signal of said predetermined polarization into a signal of said orthogonal polarization, and is further operable to transmit said forward propagating signal comprising the same said predetermined polarization upon entry into, and upon exit from said third non-reciprocal polarization conversion section.

12. The optical chiral fiber isolator of claim 11, wherein said third non-reciprocal polarization conversion section comprises a vanishing core optical fiber.

13. The optical chiral fiber isolator of claim 2, wherein at least two of said first and said second scattering sections, and said third non-reciprocal polarization conversion section, are formed as a single elongated optical fiber structure.

14. The optical chiral fiber isolator of claim 2, further comprising:
   a fourth conversion section longitudinally proximal to said first scattering section, operable to convert a signal of an input polarization into a signal of said predetermined polarization; and
   a fifth conversion section longitudinally proximal to said second scattering section operable to convert a signal of said predetermined polarization into a signal of a desired output polarization, wherein at least two of said first and said second scattering sections, said third non-reciprocal polarization conversion section, and said fourth and said fifth conversion sections are formed as a single elongated optical fiber structure.

15. The optical chiral fiber isolator of claim 3, wherein said third non-reciprocal polarization conversion section comprises a predetermined pitch profile.

* * * * *